(12) United States Patent
Laumeier et al.

(10) Patent No.: US 10,744,908 B2
(45) Date of Patent: Aug. 18, 2020

(54) TRACK ADJUSTER

(71) Applicant: Lear Corporation, Southfield, MI (US)

(72) Inventors: Marc Laumeier, Langenberg-Benteler (DE); Michael Wojatzki, Ennigerloh (DE); Wee Tzee Gam, Troy, MI (US); Mark A. Farquhar, Ortonville, MI (US); Krzysztof Wroblewski, Washington, MI (US)

(73) Assignee: Lear Corporation, Southfield, MI (US)

( * ) Notice: Subject to any disclaimer, the term of this patent is extended or adjusted under 35 U.S.C. 154(b) by 95 days.

(21) Appl. No.: 15/877,923

(22) Filed: Jan. 23, 2018

(65) Prior Publication Data
US 2018/0272899 A1 Sep. 27, 2018

(30) Foreign Application Priority Data

Mar. 23, 2017 (DE) .................. 10 2017 204 884

(51) Int. Cl.
*B60N 2/08* (2006.01)
*B60N 2/06* (2006.01)
*B60N 2/90* (2018.01)
*B60N 2/07* (2006.01)

(52) U.S. Cl.
CPC .............. *B60N 2/085* (2013.01); *B60N 2/06* (2013.01); *B60N 2/0806* (2013.01); *B60N 2/0825* (2013.01); *B60N 2/0881* (2013.01); *B60N 2/0887* (2013.01); *B60N 2/929* (2018.02); *B60N 2/0705* (2013.01); *B60N 2/08* (2013.01); *B60N 2/0837* (2013.01); *B60N 2002/952* (2018.02)

(58) Field of Classification Search
CPC .. B60N 2/0818; B60N 2/0806; B60N 2/0881; B60N 2/08; B60N 2/0893
See application file for complete search history.

(56) References Cited

U.S. PATENT DOCUMENTS

| 6,126,133 | A | 10/2000 | Timon et al. | |
|---|---|---|---|---|
| 7,722,006 | B2* | 5/2010 | Beneker | B60N 2/0806 248/424 |
| 7,905,461 | B2 | 3/2011 | Noffz | |
| 7,931,246 | B2* | 4/2011 | Brewer | B60N 2/0705 248/429 |
| 8,029,063 | B2 | 10/2011 | Kazyak et al. | |
| 8,215,602 | B2 | 7/2012 | Walter et al. | |
| 8,308,120 | B2 | 11/2012 | Zacharias et al. | |
| 8,550,420 | B2 | 10/2013 | Wojatzki et al. | |

(Continued)

FOREIGN PATENT DOCUMENTS

| CN | 201272262 Y | 7/2009 |
|---|---|---|
| CN | 201320978 Y | 10/2009 |

(Continued)

*Primary Examiner* — Bradley Duckworth
(74) *Attorney, Agent, or Firm* — Fishman Stewart PLLC

(57) ABSTRACT

A track adjuster includes a first pair of tracks, a first lockset that may be configured to selectively restrict movement of the first pair of tracks, a second pair of tracks, and a second lockset configured that may be configured to selectively restrict movement of the second pair of tracks. The first lockset may be a first type of lockset and the second lockset may be a second type of lockset. The first lockset may include a positive engagement locking lockset. The second lockset may include a pawl-type lockset.

19 Claims, 14 Drawing Sheets

(56) References Cited

U.S. PATENT DOCUMENTS

| | | |
|---|---|---|
| 8,573,698 B2 | 11/2013 | Wojatzki et al. |
| 8,746,795 B2 | 6/2014 | Stoia et al. |
| 8,967,583 B2 | 3/2015 | Stoia |
| 9,108,532 B2 | 8/2015 | Seille |
| 9,114,735 B2 | 8/2015 | Utzinger |
| 9,120,400 B2 | 9/2015 | Ruthmann et al. |
| 9,180,796 B2 | 11/2015 | Markel |
| 9,272,639 B2 | 3/2016 | Lee et al. |
| 9,308,834 B2 | 4/2016 | Tame et al. |
| 9,393,883 B2 | 7/2016 | Wojatzki et al. |
| 2008/0048476 A1 | 2/2008 | Kojima et al. |
| 2009/0218843 A1 | 9/2009 | Wojatzki et al. |
| 2012/0074287 A1 | 3/2012 | Wojatzki et al. |
| 2013/0319167 A1 | 12/2013 | Harvey et al. |

FOREIGN PATENT DOCUMENTS

| | | |
|---|---|---|
| DE | 102006047525 A1 | 5/2007 |
| DE | 112009003598 T5 | 8/2012 |
| DE | 112009003579 T5 | 9/2012 |
| DE | 102011088878 A1 | 6/2013 |
| DE | 102015220262 A1 | 2/2017 |
| FR | 2999490 A1 | 6/2014 |

\* cited by examiner

TRACK ADJUSTER

CROSS-REFERENCE TO RELATED APPLICATIONS

This application claims the benefit of German Patent Application No. 102017204884.0 filed on Mar. 23, 2017, the disclosure of which is hereby incorporated herein by reference in its entirety.

TECHNICAL FIELD

The present disclosure generally relates to track adjusters that may be used, for example, in connection with vehicle seats.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Track adjuster assemblies can be used in a number of applications, such as vehicles. Track adjuster assemblies may include pairs of tracks and locksets for selectively locking the tracks relative to each other. In configurations with multiple pairs of tracks, the same type of lockset is used for each pair of tracks.

There is a desire for solutions/options that minimize or eliminate one or more shortcomings of track adjuster assemblies. The foregoing discussion is intended only to illustrate examples of the present field and should not be taken as a disavowal of scope.

SUMMARY

In embodiments, a track adjuster may include a first pair of tracks, a first lockset that may be configured to selectively restrict movement of the first pair of tracks, a second pair of tracks, and a second lockset configured that may be configured to selectively restrict movement of the second pair of tracks. The first lockset may be a first type of lockset and the second lockset may be a second type of lockset. The first lockset may include a positive engagement locking lockset. The second lockset may include a pawl-type lockset. The first lockset may include a first set of pins and a second set of pins. The first set of pins may include a tapered configuration and the second set of pins may include a straight configuration. The second set of pins may include a first pin and a second pin. The first set of pins may include a tapered pin disposed between the first pin and the second pin. The first set of pins may include a second tapered pin disposed between the first pin and the second pin.

With embodiments, a first lockset may be coupled to a first track of the first pair of tracks. In some or all operative positions of a first track relative to the second track, at least one pin of the first lockset may be configured to engage with a second track of the first pair of tracks. A second lockset may be coupled with a first track of the second pair of tracks. A first track of the first pair of tracks and the first track of the second pair of tracks may include a first set of positions and a second set of positions relative to the second track of the first pair of tracks and a second track of the second pair of tracks, respectively. Engagement recesses of the second track of the second pair of tracks may be configured such that in the first set of positions, lock plates of the second lockset may be aligned to engage the second track of the second pair of tracks, and, in the second set of positions, the lock plates of the second lockset may not aligned to engage the second track of the second pair of tracks. The first lockset may be configured such that in the second set of positions, the first track of the first pair of tracks may be permitted to shift to an adjacent position in the first set of positions. The first lockset may include a housing and a bracket connecting the housing with a movable track of the first pair of tracks. Each pin of the first set of pins and the second set of pins may be disposed at least partially in a recess of the bracket. Each pin of the first set of pins and the second set of pins may be disposed at least partially in an aperture of the housing.

In embodiments, a track adjuster may include a cross member configured to actuate the first lockset and the second lockset. The cross member may be connected to a movable track of the first pair of tracks via a mounting bracket. The mounting bracket may include a first connector, a second connector, and/or an aperture for receiving a bearing. A cross member may be configured to actuate the first lockset and the second lockset. The cross member may be connected to a movable track of the second pair of tracks via a mounting bracket. The mounting bracket may include a substantially horizontal portion connected to the movable track. The mounting bracket may include a substantially vertical portion that may extend from the substantially vertical portion. The substantially vertical portion may include a first aperture for receiving a bearing and/or a second aperture through which a connecting member of the cross member may extend. The mounting bracket may include a flange that may be configured to limit rotation of the cross member.

With embodiments, each pin of a first set of pins and a second set of pins of the first lockset may be configured to move independently of each other pin. The first lockset may include a plurality of springs. Each spring may be configured to bias a respective pin of the first set of pins and the second set of pins. A second lockset may include a plurality of lock plates each having a plurality of teeth.

Various aspects of the present disclosure will become apparent to those skilled in the art from the following detailed description of the various embodiments, when read in light of the accompanying drawings.

DETAILED DESCRIPTION

Reference will now be made in detail to embodiments of the present disclosure, examples of which are described herein and illustrated in the accompanying drawings. While the disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure.

Figure 1:
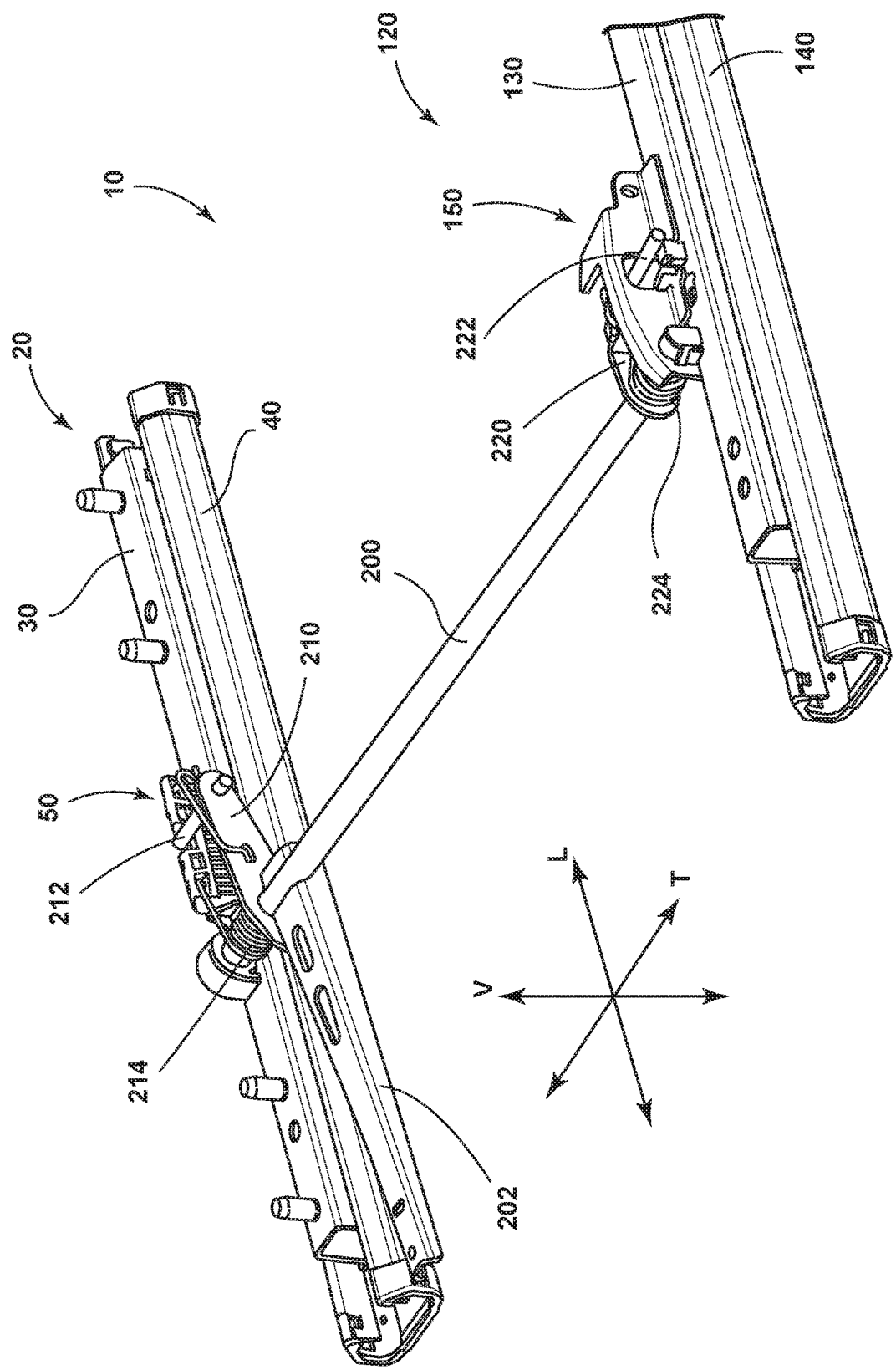
FIG. 1 is a perspective view generally illustrating portions of a track adjuster in accordance with an embodiment of the present disclosure.

In embodiments, such as generally illustrated in FIG. 1, a track assembly or track adjuster 10 may include a first pair of tracks 20, a first lockset 50 associated with first pair of tracks 20, a second pair of tracks 120, a second lockset 150 associated with the second pair of tracks 120, and/or a cross member 200. First lockset 50 may be configured to selectively lock a first track 30 of first pair of tracks 20 relative to a second track 40 of first pair of tracks 20. Second lockset 150 may be configured to selectively lock a first track 130 of second pair of tracks 120 relative to a second track 140 of second pair of tracks 120. With embodiments, first tracks 30, 130 may be configured to move/slide relative to second tracks 40, 140 (e.g., first tracks 30, 130 may be movable tracks).

With embodiments, cross member 200 may be configured for actuation by a user and/or may include a handle 202. For example, and without limitation, cross member 200 may be configured to control engagement and/or disengagement of first lockset 50 and/or second lockset 150. Cross member 200 may include a first cross member lever 210 that may rotate with cross member 200. A first connecting member 212 may be connected to rotate with first cross member lever 210 and may engage and/or actuate first lockset 50. Cross member 200 may include a second cross member lever 220 that may rotate with cross member 200. A second connecting member 222 may be connected to rotate with second cross member lever 220 and may engage and/actuate second lockset 150. First connecting member 212 and/or second connecting member 222 may, for example, include generally cylindrical or pin-like configurations. Track assembly 10 may include one or more cross member biasing members that may be configured to bias cross member, such as to an initial/locked position (see, e.g., FIG. 1). For example, and without limitation, a first cross member biasing member 214 may be connected to first lockset 50, first cross member lever 210, and/or first connecting member 212 and may bias cross member 200 to an initial/locked position. Additionally or alternatively, a second cross member biasing member 224 may be connected to second lockset 150, second cross member lever 220, and/or second connecting member 222 and may bias cross member 200 to an initial/locked position.

Figure 1B:
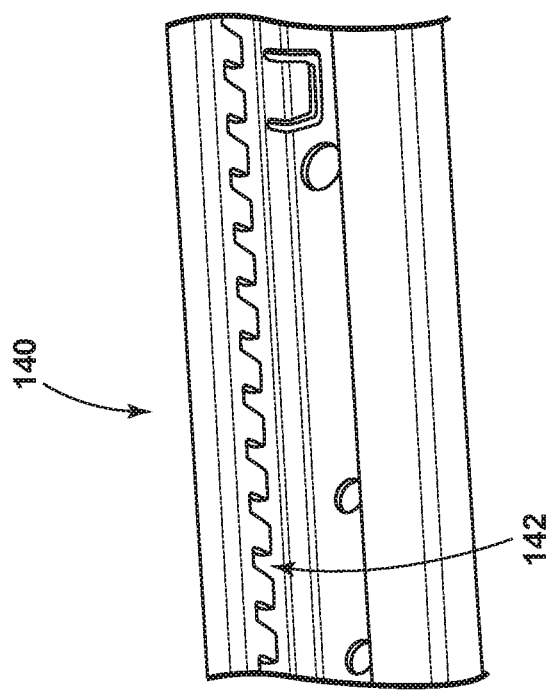
FIG. 1B is a perspective view generally illustrating portions of a second track in accordance with an embodiment of the present disclosure.
Figure 1A:
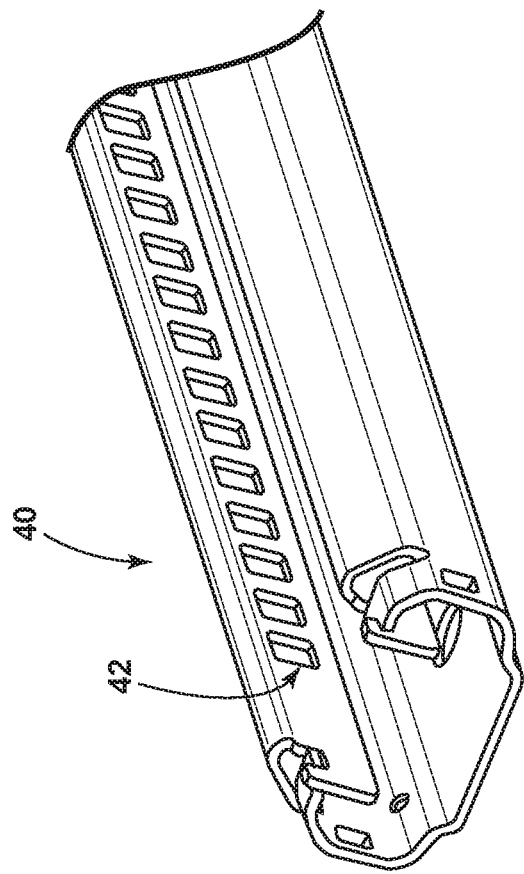
FIG. 1A is a perspective view generally illustrating portions of a second track in accordance with an embodiment of the present disclosure.

As generally illustrated in FIG. 1A, for example, second track 40 of first pair of tracks 20 may include a generally U-shaped configuration. Second track 40 may include a plurality of locking apertures/recesses (e.g., apertures 42) that may be configured to receive and/or engage pins 52 of first lockset 50. As generally illustrated in FIG. 1B, for example, second track 140 of second pair of tracks 120 may include a generally U-shaped profile and/or may include a plurality of locking apertures/recesses (e.g., recesses 142) that may be configured to receive and/or engage lock plates 152 of second lockset 150. With embodiments, second track 40 and second track 140 may or may not include the same configuration. For example, and without limitation, second track 40 may include apertures 42 into which pins 52 of first lockset 50 may slide (e.g., substantially horizontally) and second track 140 may include recesses 142 into which lock plates 152 of second lockset 150 may rotate. Apertures 42 and/or recess 142 may be disposed in a generally vertical plane that may be substantially parallel with a longitudinal direction.

With embodiments, such as generally illustrated in FIGS. 2A, 2B, 3A, 3B, 3C, 3D, and 3E, first lockset 50 may include a plurality of pins 52, a bracket 60, a housing 70, an actuator 80, and/or a plurality of biasing members 90. In embodiments, first lockset 50 may be configured as a positive engagement locking (PEL) lockset. For example, and without limitation, in each position of first track 30 relative to second track 40, at least one pin 52 may be engaged with and/or aligned to be engaged with an aperture 42 of second track 40.

Bracket 60 may be configured to connect first lockset 50 to first track 30 and/or may be configured to support pins 52, housing 70, actuator 80, and/or biasing members 90, in embodiments. Bracket 60 may include one or more of a variety of shapes, sizes, configurations, and/or materials. For example, and without limitation, bracket 60 may include a generally U-shaped configuration. Bracket 60 may include a first connecting portion 62 and/or a second connecting portion 64 that may be configured for connecting bracket 60 with first track 30. First connecting portion 62 and/or second connecting portion 64 may, for example, extend generally vertically upward and may be configured to be received in an aperture or recess 32 of first track 30. With embodiments, bracket 60 may include a slot or recess 66 for each pin 52. For example, and without limitation, slots/recesses 66 may be generally rectangular and/or may be configured for pins 52 to slide (e.g., generally horizontally) within them. Slots/recess 66 may be configured to restrict, at least to some degree, movement of pins 52, such as in a longitudinal direction L and/or a vertical direction V.

In embodiments, housing 70 may be connected to first track 30 via bracket 60 and may be configured to at least partially support pins 52, actuator 80, and/or biasing members 90. Housing 70 may be supported by bracket 60 and/or may include a recess 72 configured to at least partially receive bracket 60. Recess 72 may, for example, extend generally in a longitudinal direction L and/or a vertical direction V (e.g., may be generally U-shaped). Recess 72 may be configured to receive bracket 60 such that recesses 66 of bracket 60 are aligned with respective pins 52. Housing 70 may rotatably support actuator 80 such that actuator 80 may be configured to rotate relative to housing 70 about an actuator axis 82 that may be generally parallel with the longitudinal direction L. Housing 70 may include a section or slot (e.g., slots 74) for each pin 52. Slots 74 may be separated from each other, at least in some areas.

In embodiments, first lockset 50 may include one or more pins 52. For example, and without limitation, first lockset 50 may include six pins 52. Pins 52 may include one or more of a variety of shapes, sizes, configurations, and/or materials. Pins 52 may include a generally L-shaped configuration that may include a generally vertical portion 54 configured to engage a biasing member 90 and/or be actuated by actuator 80. Vertical portion 54 may include a neck 54A that may be narrower than the rest of vertical portion 54 and/or that may be configured to slide through a narrow portion 66A of a bracket recess 66. Pins 52 may include a generally horizontal portion 56 that may be configured for engaging second track 40 (e.g., second track apertures 42) and/or that may be generally rectangular.

Figure 2A:
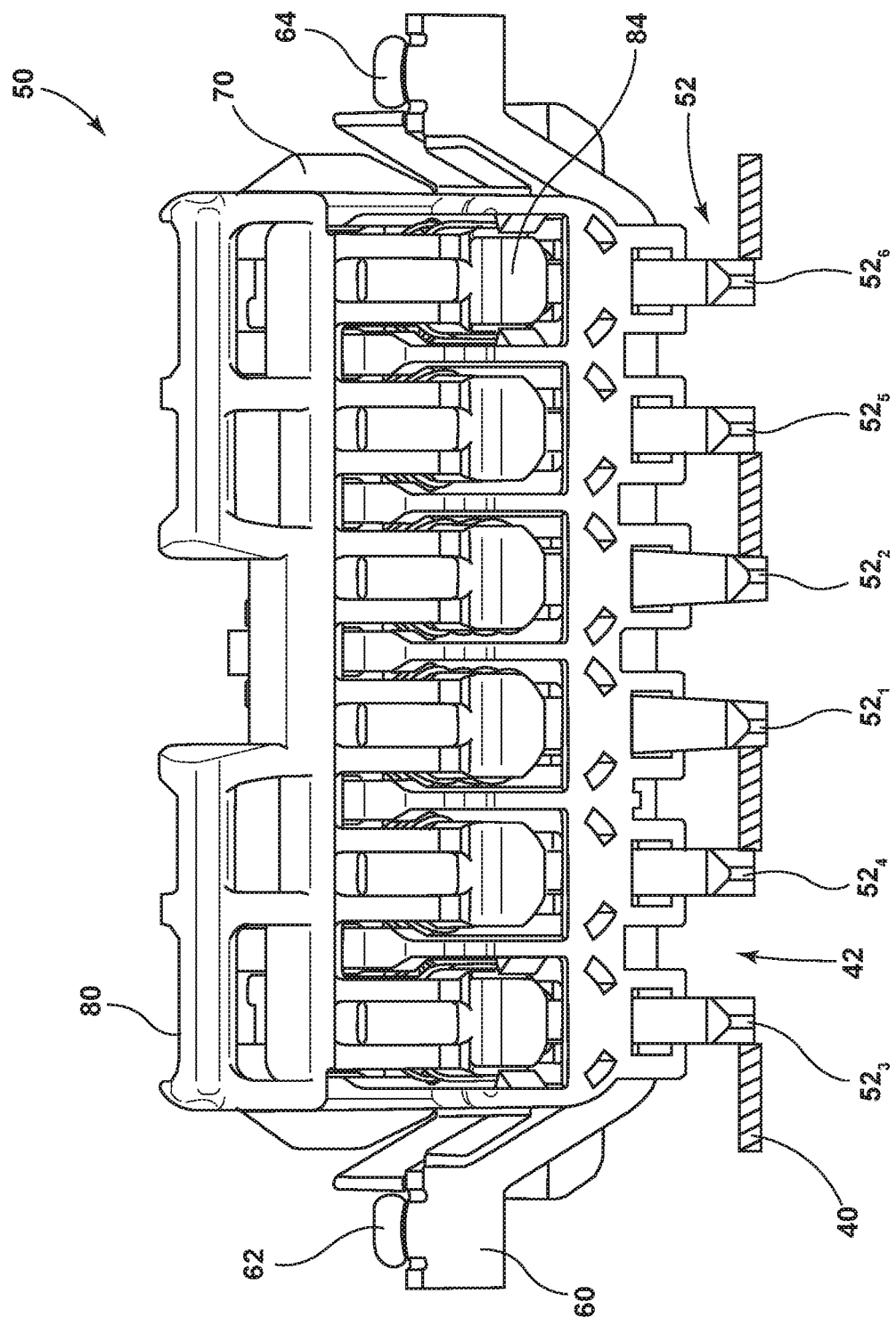
FIGS. 2A and 2B are perspective views generally illustrating portions of a first lockset in accordance with an embodiment of the present disclosure.
Figure 2B:
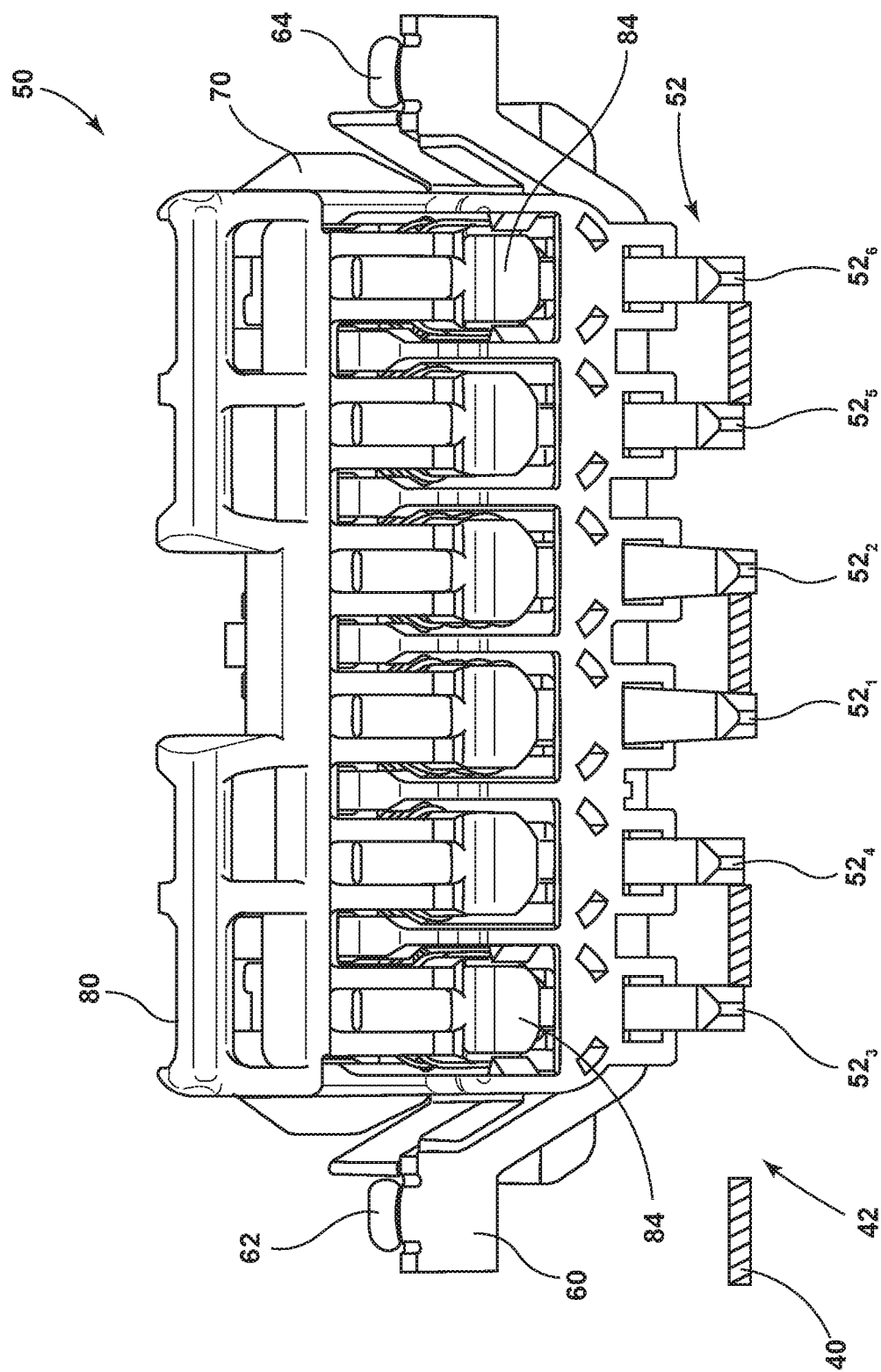
Figure 3A:
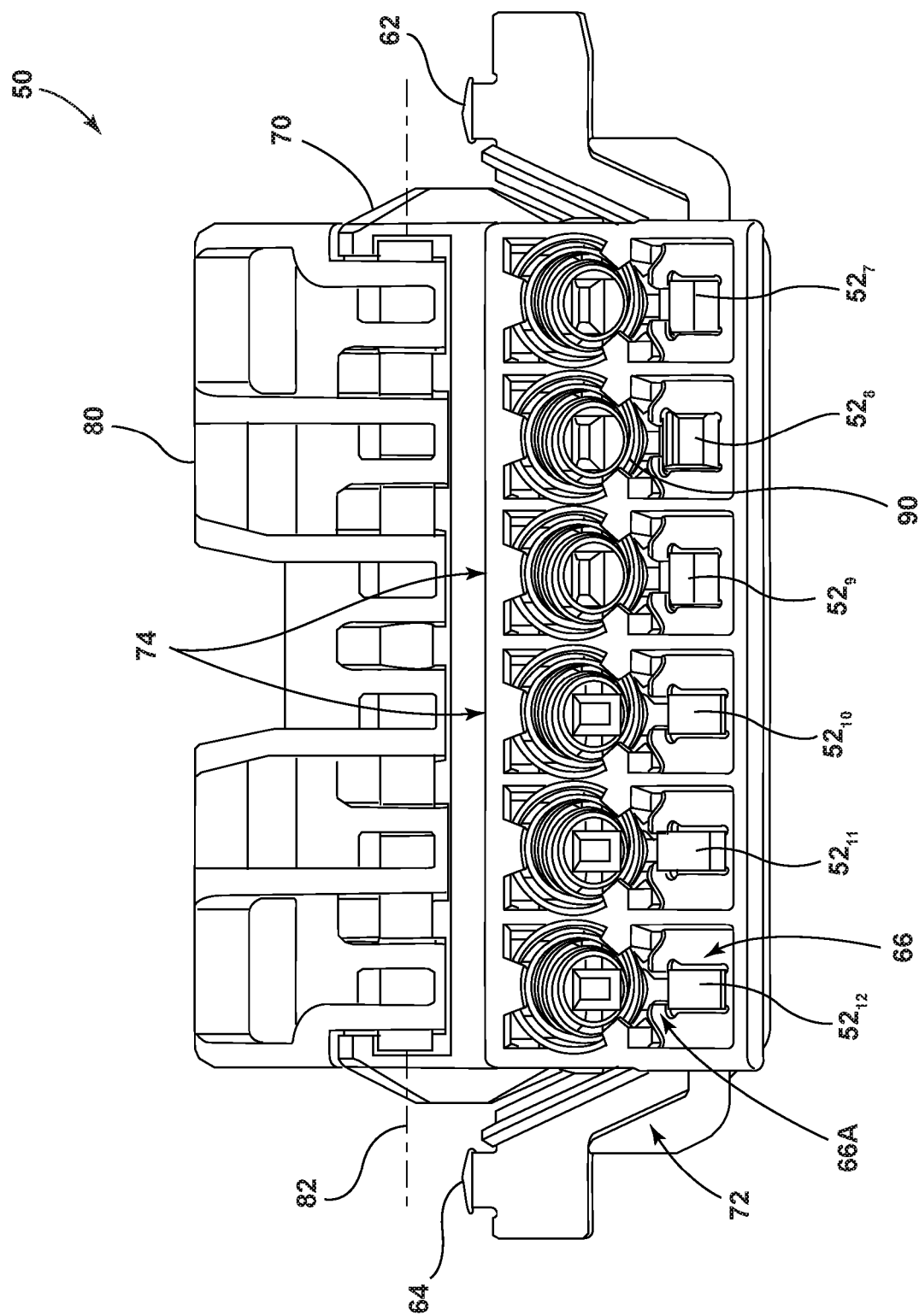
FIG. 3A is a side view generally illustrating portions of a first lockset in accordance with an embodiment of the present disclosure.
Figure 3B:
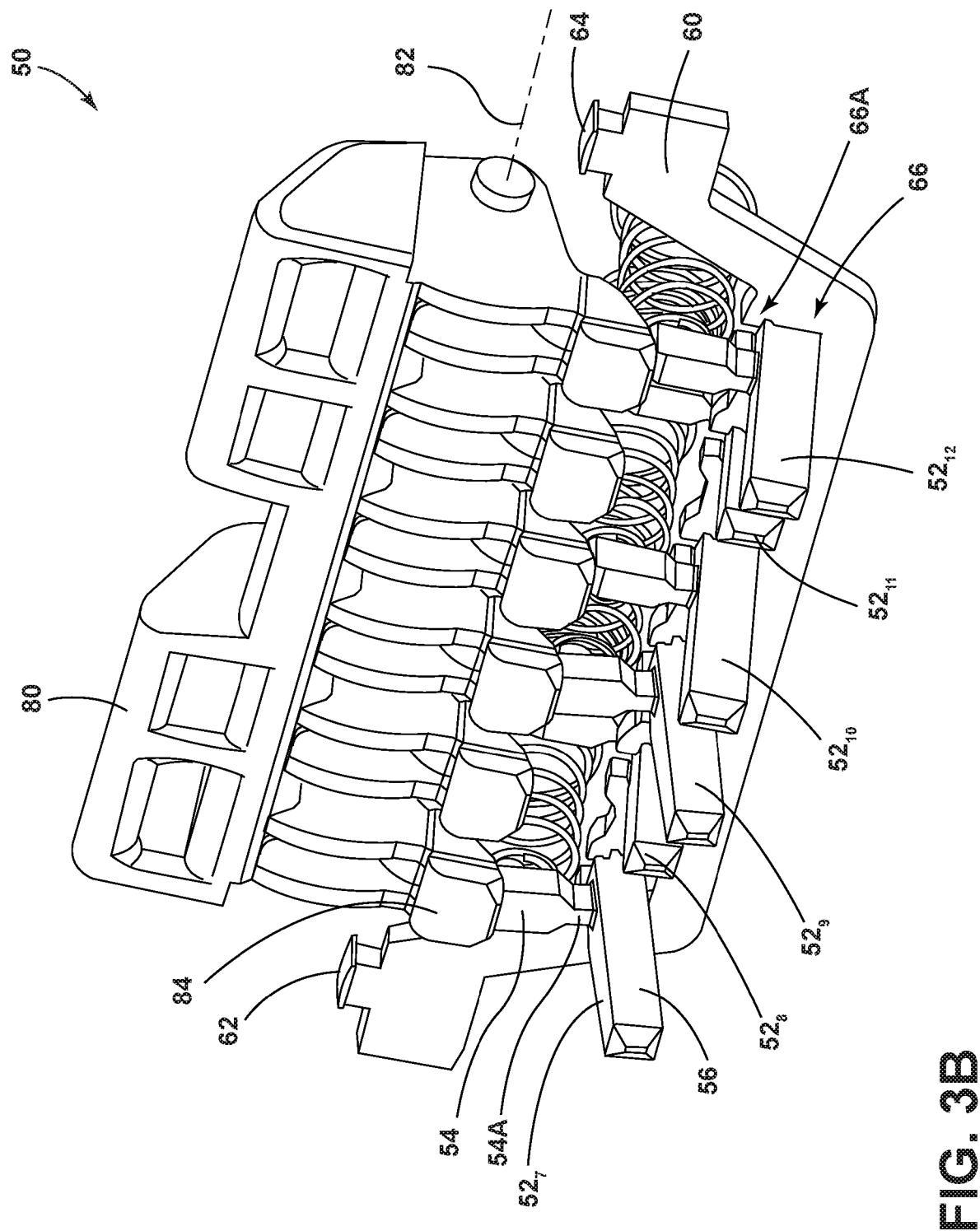
FIG. 3B is a perspective view generally illustrating portions of a first lockset in accordance with an embodiment of the present disclosure.
Figure 3C:
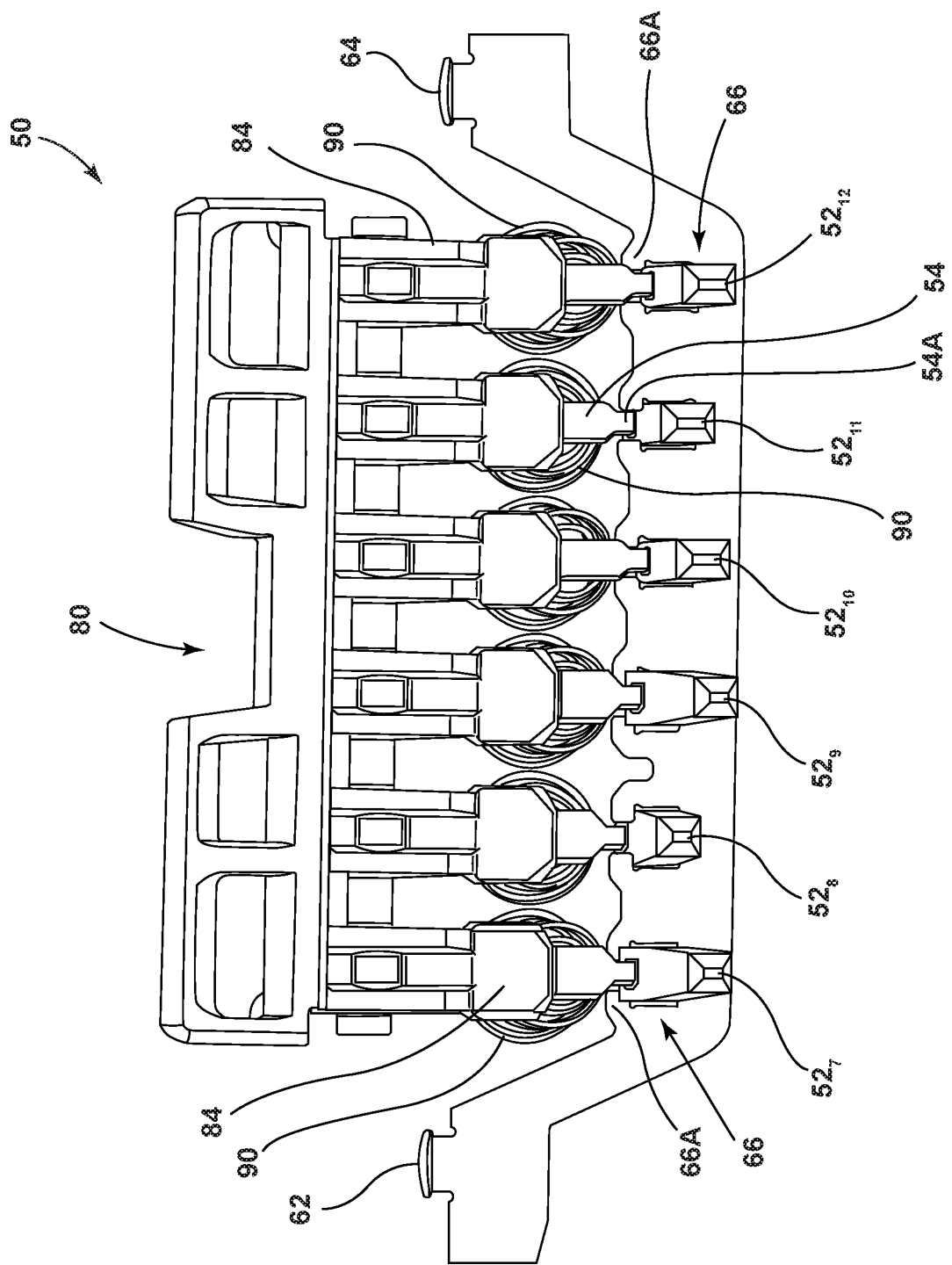
FIG. 3C is a side view generally illustrating portions of a first lockset in accordance with an embodiment of the present disclosure.
Figure 3D:
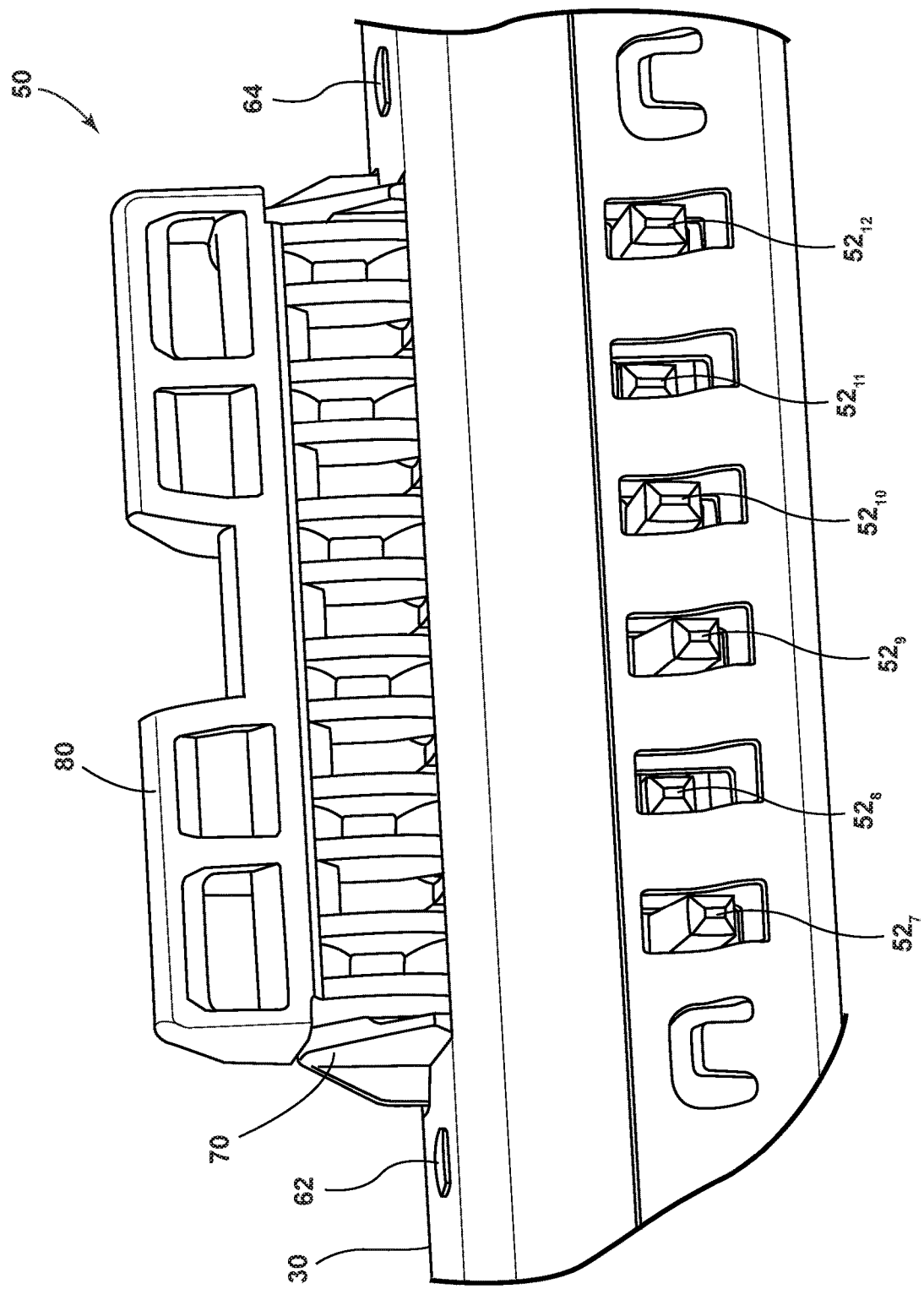
FIG. 3D is a perspective view generally illustrating portions of a first lockset and a first track in accordance with an embodiment of the present disclosure.
Figure 3E:
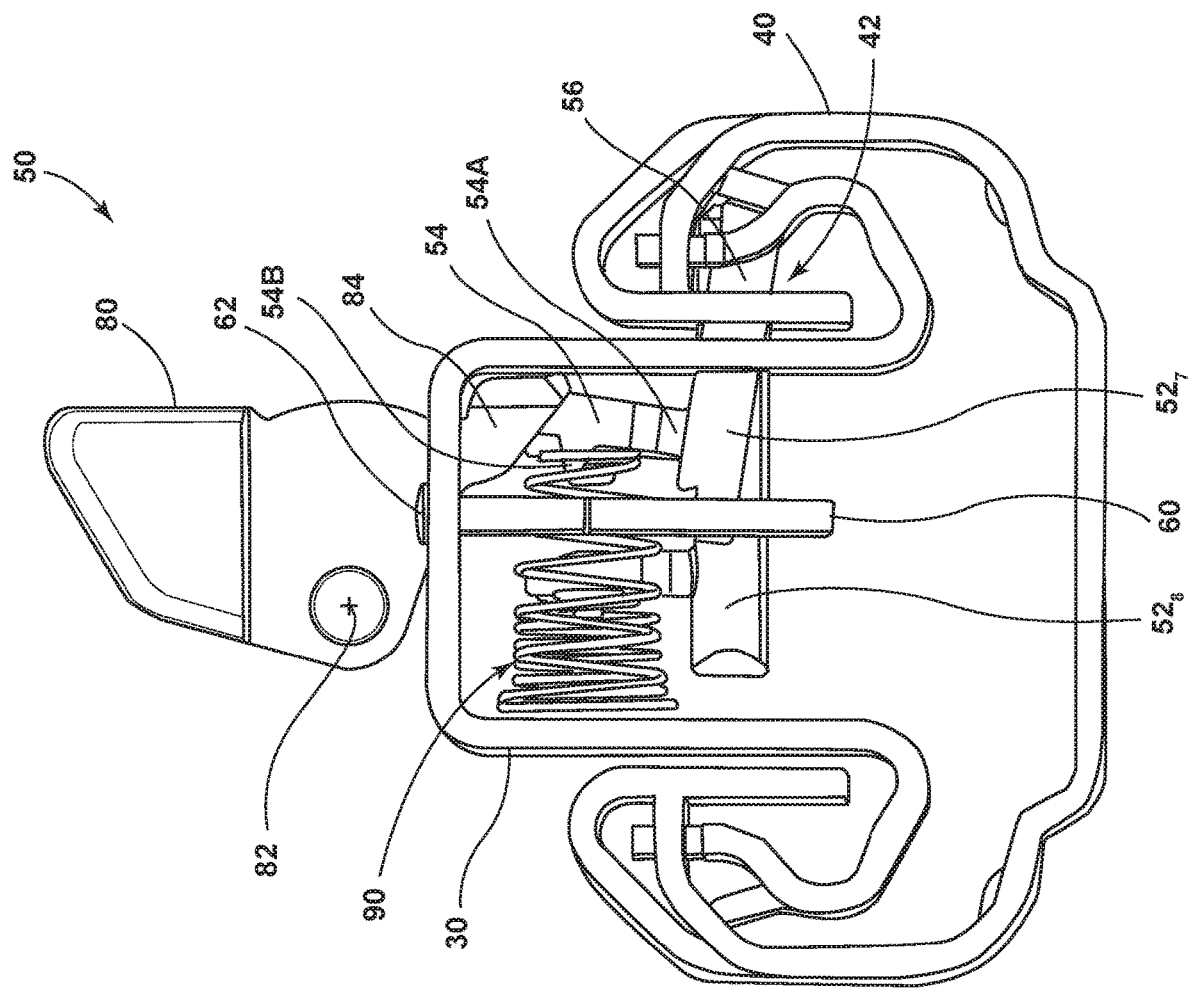
FIG. 3E is a side view generally illustrating portions of a first lockset, a first track, and a second track in accordance with an embodiment of the present disclosure.

First lockset 50 may include a first and second set of pins 52, in embodiments. A first set of pins 52 (e.g., pins $52_1$, $52_2$, $52_7$, $52_8$, $52_9$) may include a generally tapered configuration in which the width of horizontal portions 56 of the pins 52 (e.g., in a longitudinal direction L) decreases toward second track apertures 42. A second set of pins 52 (e.g., pins $52_3$, $52_4$, $52_5$, $52_6$, $52_{10}$, $52_{11}$, $52_{12}$) may include a generally straight configuration in which the width of the pins 52 remains generally constant. First and second sets of pins 52 may be disposed/arranged in one or more of a variety of ways. For example, and without limitation, two pins (e.g., pins $52_1$, $52_2$) from the first set of pins 52 may be disposed between one or more pins (e.g., pins $52_3$, $52_4$) from the second set of pins 52 on one side and one or more pins (e.g., pins $52_5$, $52_6$) from the second set of pins 52 on another side, such as generally illustrated in FIGS. 2A and 2B. Additionally or alternatively, three pins (e.g., pins 527, 528, 529) from the first set of pins 52 may be disposed next to three pins (e.g., $52_{10}$, $52_{11}$, $52_{12}$) from the second set of pins (see, e.g., FIGS. 3A-3E). Pins 52 may be configured to move/slide independently of each other. Tapered pins (e.g., pins $52_1$, $52_2$, $52_7$, $52_8$, $52_9$) may compensate for manufacturing tolerances and/or may reduce play between first and second tracks 30, 40.

With embodiments, actuator 80 may be configured to control engagement of pins 52 with second track 40. For example, and without limitation, in a locked/engaged state, actuator 80 may permit at least one pin 52 to engage second track 40. In an unlocked/disengaged state, actuator 80 may apply a generally linear force (e.g., in a transverse direction T) to at least some of pins 52 such that none of pins 52 are engaged with second track 40. Actuator 80 may include one or more actuator arms 84 that may each be configured to act on/engage a respective pin 52. With embodiments, actuator 80 may be formed as a single, unitary component and/or arms 84 may not be configured to move independently of each other. In embodiments, actuator 80 may rotate about a rod-like projection that may be integrally formed with housing 70.

First lockset 50 may include, in embodiments, a biasing member 90 for each pin 52. Biasing members 90 may be connected to and/or disposed in housing 70 such that biasing members 90 bias pins 52 toward engagement with second track 40 (e.g., a locked position). Biasing forces provided by biasing members 90 may be directed generally in a transverse direction T. Biasing members 90 may include one or more of a variety of shapes, sizes, configurations, and/or materials. For example, and without limitation, biasing members 90 may include coil springs that may include generally conical shapes. Biasing members 90 may act directly on pins 52 and may or may not directly act on/contact actuator 80. Pins 52 may include projections 54B that may be configured to be received by and/or to retain biasing members 90.

With embodiments, cross member 200 may be actuated, such as by a user. Rotation of cross member 200 may apply a force to actuator 80, such as via first cross member lever 210 and/or first connecting member 212. If the force of rotation is greater than biasing forces of biasing members 90, actuator 80 may rotate. Rotation of actuator 80 may cause arms 84 of actuator 80 to engage one or more pins 50, which may slide pins 52 within bracket recesses 66, into housing 70, and/or out of engagement with second track 40. Some pins 52 (e.g., pins $52_8$, $52_{11}$) may not be aligned with an aperture 42 in second track 40 or engaged with second track 40, so at least initial rotation of actuator 80 may not cause engagement of an arm 84 with such pins 52 (e.g., such pins 52 may not slide initially). If cross member is rotated a sufficient amount, all pins 52 may be disengaged from second track 40, which may permit first track 30 to slide/move relative to second track 40 while cross member 200 remains rotated.

In embodiments, if cross member 200 is not actuated and/or stops being actuated (e.g., a user lets go of cross member 200), cross member biasing members 214, 224 may bias cross member 200 back to an initial/locked position, which may include disengaging first cross member lever 210 and/or first connecting member 212 from actuator 80 and/or reducing the force applied to actuator 80. Biasing members 90 may bias pins 52 into engagement with second track 40. With embodiments, second track 40 and first lockset 50 may be configured such that in every position of first track 30 and first lockset 50 relative to second track 40, at least one pin 52 may be aligned with an aperture 42 of second track 40.

In embodiments, as pins 52 slide (e.g., in a transverse direction T), pins 52 may move and/or tilt in a vertical direction V. For example, and without limitation, as pins 52 slide out of housing 70 and/or into engagement with second track 40, ends of pins 52 may tilt downward. As pins 52 slide into housing 70, ends of pins 52 may tilt upward (e.g., such that horizontal portions 56 are generally parallel with a horizontal plane).

With embodiments, such as generally illustrated in FIGS. 4, 5, 6A, 6B, 7A, and 7B, second lockset 150 may include one or more lock plates 152 and an actuator 160 that may actuate lock plates 150 (e.g., a trigger or pawl configuration). For example, and without limitation, second lockset 150 may include two lock plates 152 (e.g., lock plates $152_1$, $152_2$) that may extend generally in a first transverse direction T and may be configured to engage recesses 142 of a first side of second track 140. Second lockset 150 may include another two lock plates (e.g., lock plates $152_3$, $152_4$) that may extend in an opposite transverse direction and may be configured to engage recesses 142 of a second/opposite side of second track 140. Lock plates 152 may include one or more of a variety of shapes, sizes, configurations, and/or materials. For example, lock plates may include teeth 154 that may be configured to engage recesses 142 of second track 140. Lock plates 152 may or may not include the same number of teeth. For example, and without limitation, in a first configuration, lock plates $152_1$, $152_2$, $152_3$, $152_4$ may include two teeth, four teeth, four teeth, and two teeth, respectively (see, e.g., FIG. 7A). In another configuration, lock plates $152_5$, $152_6$, $152_7$ may include two teeth, three teeth, and six teeth, respectively (see, e.g., FIG. 7B).

Lock plates 152 may be connected to first track 130 of second pair of tracks 120 via a rod 156 that may be disposed generally parallel with a longitudinal direction L, and lock plates 152 may be configured to rotate about rod 156 such that teeth 154 engage or disengage recesses 142 (e.g., about a longitudinal axis 158), in embodiments. A biasing member 170 may bias lock plates 152 into a locked/engaged position (e.g., a generally horizontal position). Some or all of lock plates 152 may be configured to move/rotate independently of each other.

Figure 6A:
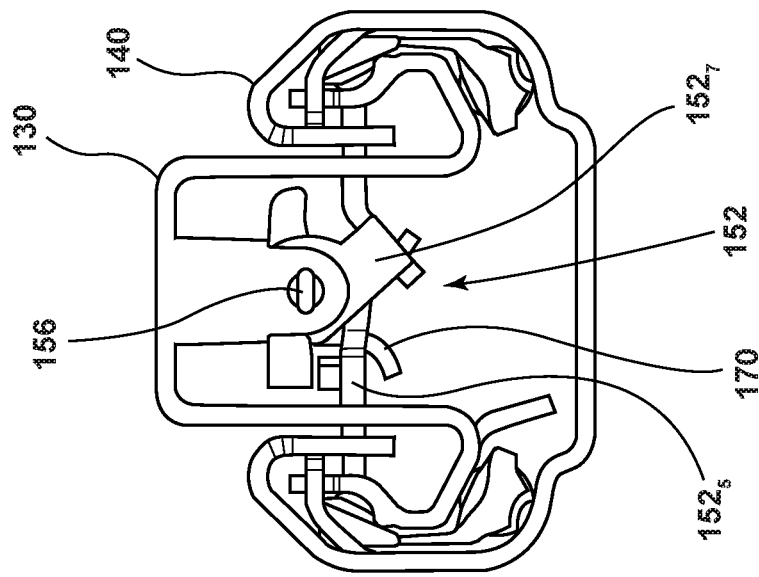
FIGS. 6A and 6B are side views generally illustrating portions of second locksets, first tracks, and second tracks in accordance with embodiments of the present disclosure.
Figure 6B:
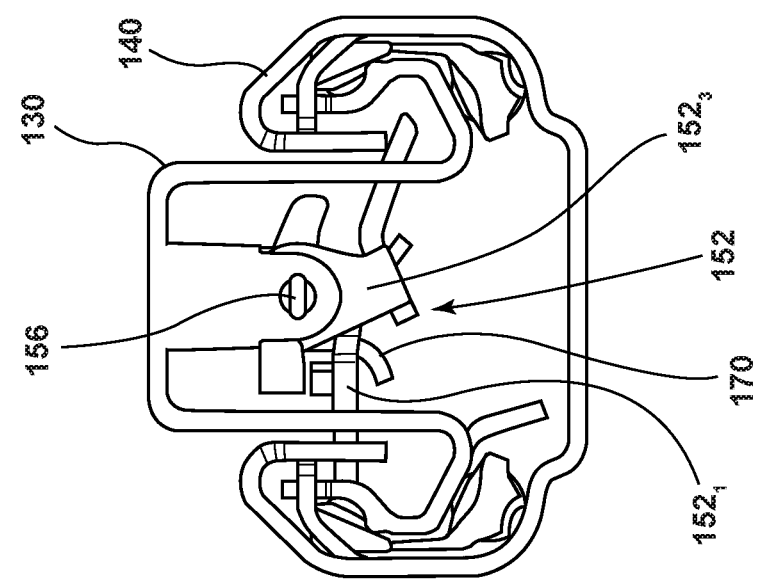
Figures 7A, 7B:
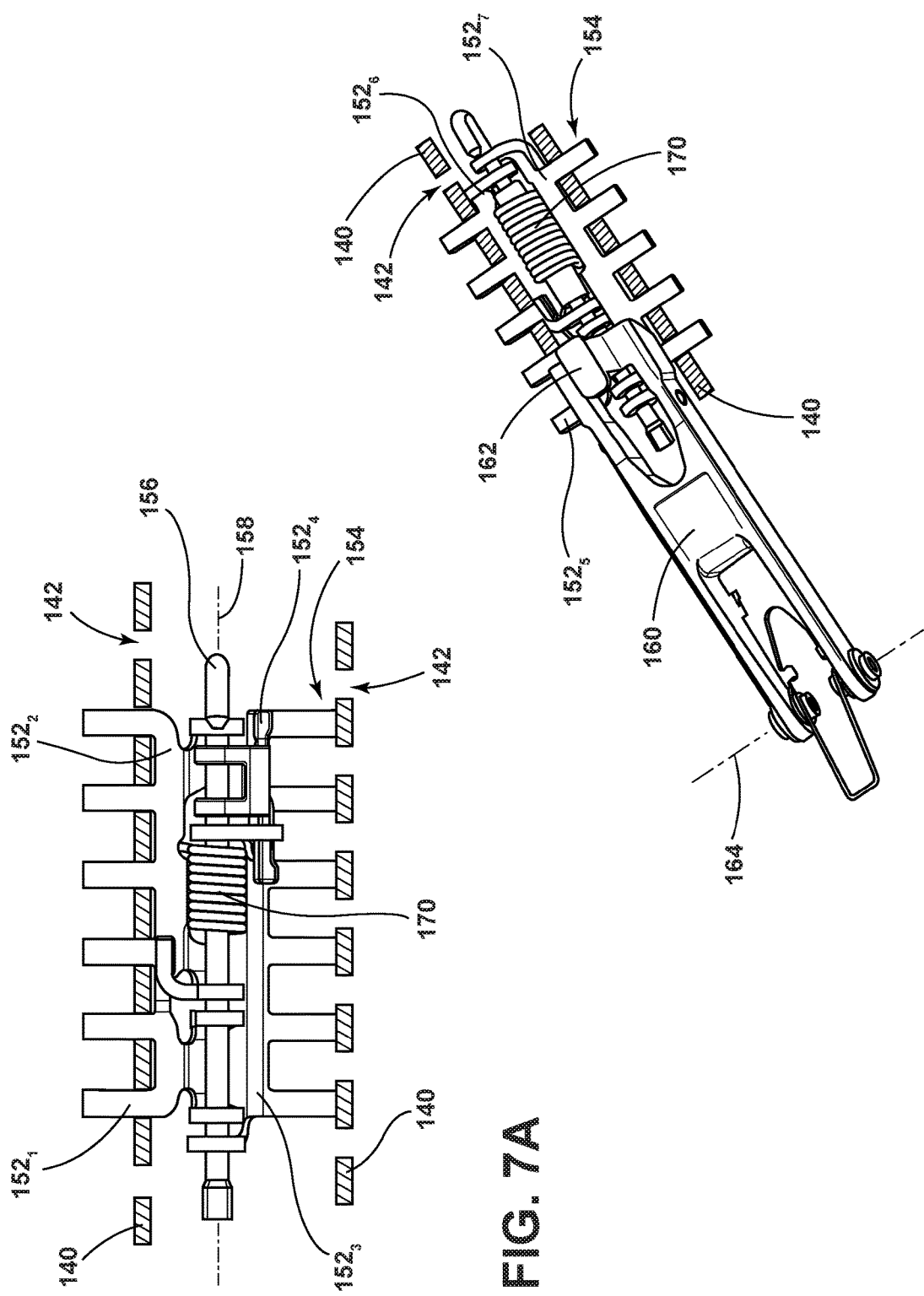
FIG. 7A is a top view generally illustrating portions of a second lockset in accordance with an embodiment of the present disclosure.
FIG. 7B is a perspective view generally illustrating portions of a second lockset in accordance with an embodiment of the present disclosure.
Figure 8B:
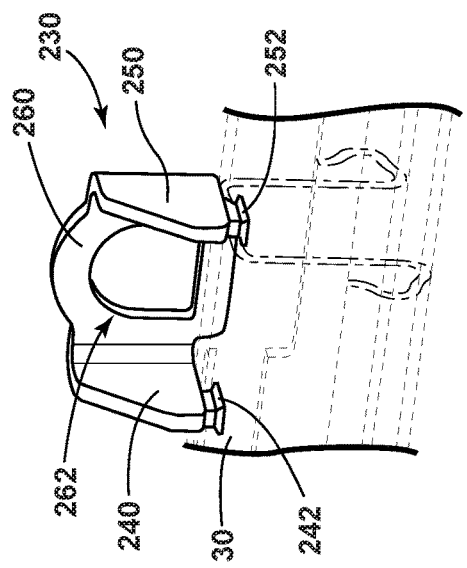
FIGS. 8A-8D are perspective views generally illustrating portions of cross member mounting brackets in accordance with embodiments of the present disclosure.
Figure 8A:
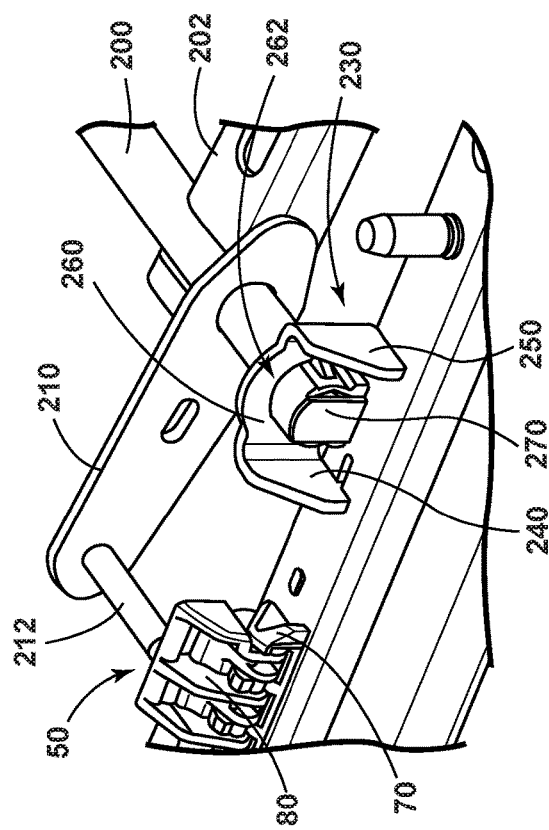
Figure 8D:
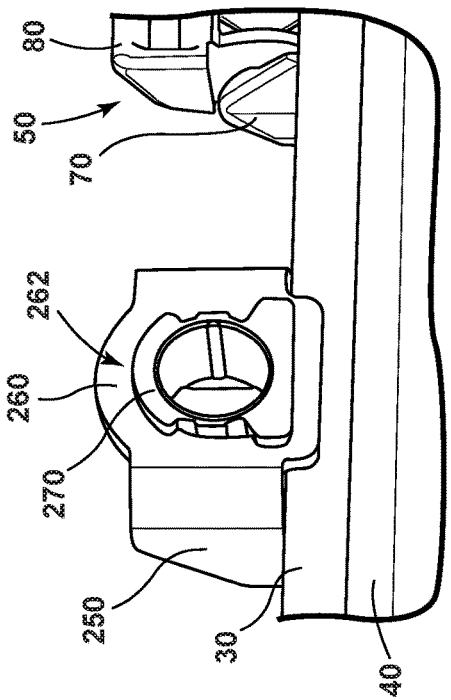
Figure 8C:
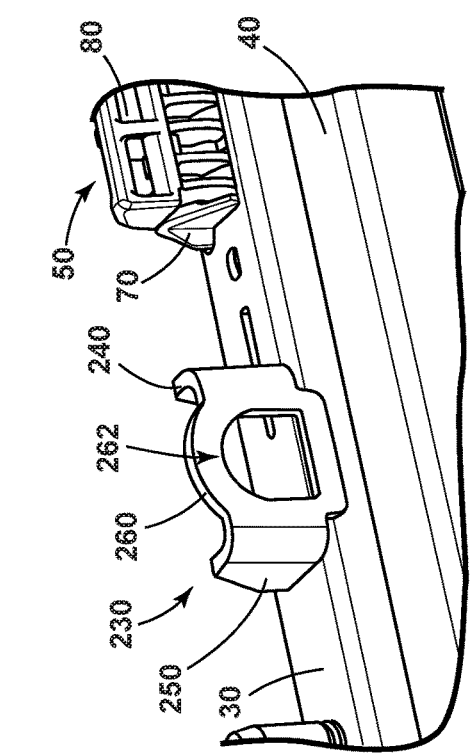

In an initial/locked state, at least one lock plate 152 may be engaged with recesses 142 of second track 140, which may prevent and/or restrict relative movement between first track 130 and second track 140, in embodiments. In an unlocked state, each lock plate 152 may be disengaged from (e.g., rotated out of) recesses 142 of second track 140, which may permit relative movement between first and second tracks 130, 140. With embodiments, second lockset 150 and/or second track 140 may be configured such that teeth 154 of certain lock plates 152 will be aligned with recesses in a first set of positions of first track 130 and second track 140, and teeth of certain other lock plates 152 will be aligned with recesses 142 in a second set of positions of first track 130 and second track 140. For example, and without limitation, teeth 154 of lock plates $152_1$, $152_2$ may be aligned with recesses 142 in a first set of positions and teeth 154 of lock plates $152_3$, $152_4$ may not be aligned with recesses 142 in the first set of positions, such as the positions generally illustrated in FIGS. 6A and 7A. Additionally or alternatively, teeth 154 of lock plates $152_1$, $152_2$ may not be aligned with recesses in a second set of positions and teeth 154 of lock plates $152_3$, $152_4$ may be aligned with recesses 142 in the second set of positions. In embodiments, second lockset 150 and/or second track 140 may be configured such that teeth 154 of all lock plates 152 (e.g., lock plates $152_5$, $152_6$, $152_7$) will be aligned with recesses 142 in a first set of positions of first track 130 and second track 140, such as generally illustrated in FIGS. 6B and 7B, and no teeth 154 of any lock plate 152 will be aligned with recesses 142 in a second set of positions.

Actuator 160, in embodiments, may be rotatably connected to first track 130 and may be configured for actuation by second connecting member 222. For example, and without limitation, rotation of cross member 200 may cause second connecting member 222 to apply a downward force to a projection 162 of actuator 160, which may cause actuator 160 to rotate downward (e.g., about axis 164 parallel to a transverse direction T). Downward rotation of actuator 160 may cause downward rotation of lock plates 152 (e.g., about rod 156 and/or axis 158), which may disengage teeth 154 from recesses 142.

With embodiments, first lockset 50 and second lockset 150, which may be of different types, may cooperate to selectively restrict movement of first pair of tracks 20 and second pair of tracks 120. First lockset 50 may be configured such that in any position of first tracks 30, 130 relative to the second tracks 40, 140 (e.g., any position in which a user selects for the track assembly to be disposed/locked), a pin 52 may be aligned/lockable with an aperture 42 of second track 40 to provide at least an initial locking. If, in the selected position, at least some teeth 154 of lock plates 152 of second lockset 150 are aligned with recesses 142 in second track 140, first tracks 30, 130 may be locked in the selected position. If, in the selected position, teeth 154 of lock plates 152 of second lockset 150 are not aligned with recesses 142, track assembly 10 may be configured to permit a shift/transition of first tracks 30, 130 to another/final locked position (e.g., an adjacent position) in which teeth 154 are aligned with and may engage/lock with recesses 142. For example, and without limitation, apertures 42 may be sufficiently wider (e.g., in a longitudinal direction L) than pins 52 such that if only one pin 52 is disposed in a particular aperture 42, the pin 52 may move within aperture 42, which may permit first track 30 (and first track 130) to move, at least to some degree, relative to second track 40. The amount of shift permitted may, in embodiments, correspond to a distance between adjacent recesses 142 of second track 140. With embodiments, in final locked positions, two pins 52 of first lockset 50 may be disposed in and/or engaged with the same aperture 42 of second track 40 and/or at least some teeth 154 of lock plates 152 of second lockset 150 may be engaged with recesses 142 of second track 140. Two pins of first lockset in the same aperture may be from the same set or from different sets. For example, and without limitation, both pins may be tapered (e.g., pins $52_1$, $52_2$ in FIG. 2A), both pins 52 may be straight (e.g., pins $52_3$, $52_4$ and pins $52_5$, $52_6$ in FIG. 2A), or pins 52 may be a combination of tapered and straight (e.g., pins $52_1$, $52_4$ and $52_2$, $52_5$ in FIG. 2B).

In embodiments, such as generally illustrated in FIGS. 8A, 8B, 8C, and 8D, cross member 200 may be connected to first track 30 via a first mounting bracket 230. Mounting bracket may be generally U-shaped and may open away from cross member 200 (e.g., in a transverse direction T). Mounting bracket 230 may include a first portion 240 that may be configured for connecting mounting bracket 230 with first track 30, a second portion 250 that may be configured for connecting mounting bracket 230 with first track 30, and/or a third portion 260 for connecting with cross member 230. Third portion 260 may include an aperture 262 for receiving cross member 200 and/or for receiving a bearing 270 that may be configured to receive cross member 200. Bearing 270 may be configured to facilitate rotation of cross member 200 and/or may be plastic. First portion 240 may include a first connector 242 and/or second portion 250 may include a second connector 252. First connector 242 and second connector 252 may be configured to engage a top of first track 30. Mounting bracket 230 may or may not be independent of first lockset bracket 60.

Figure 4:
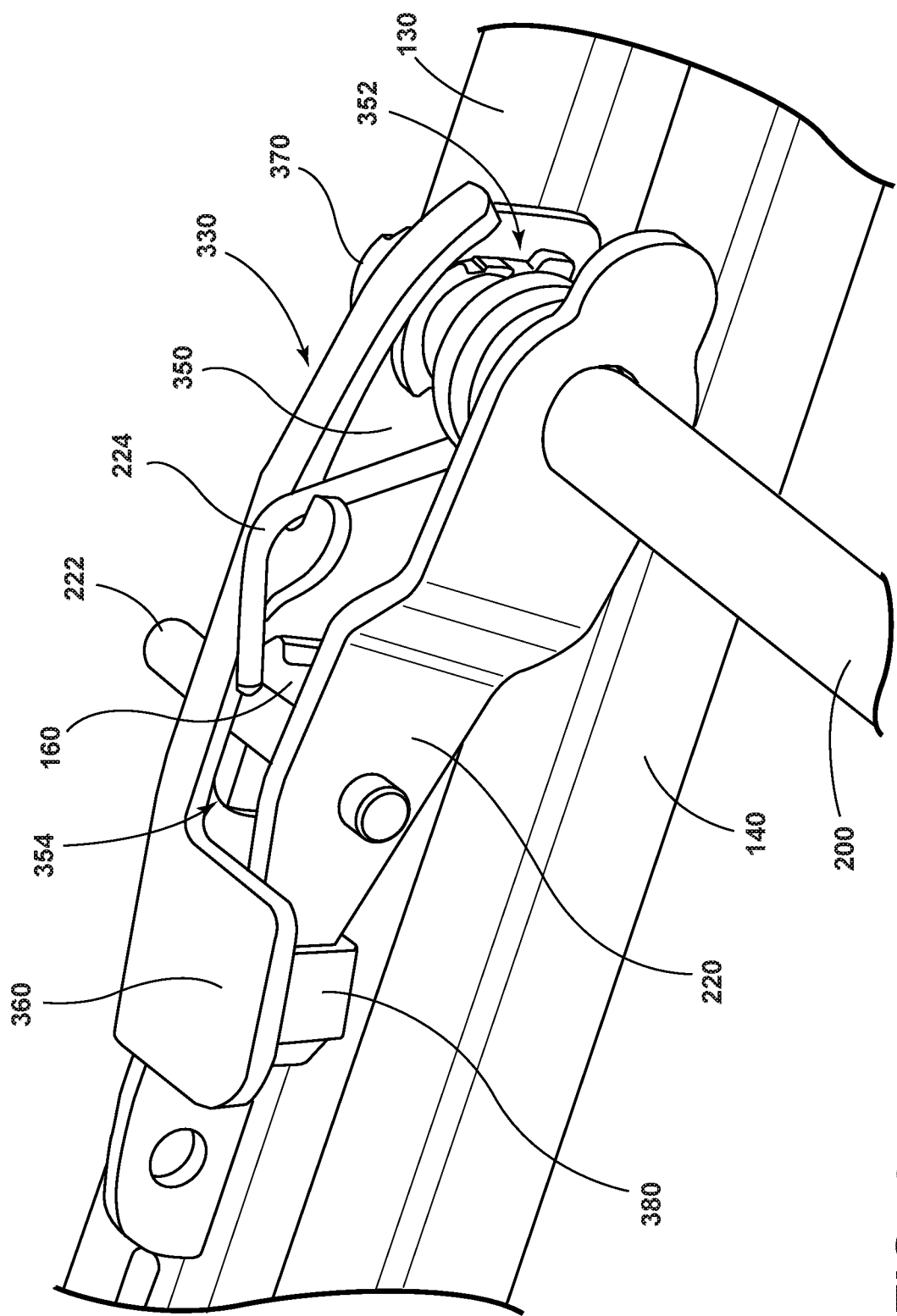
FIG. 4 is a perspective view generally illustrating portions of a second lockset and a cross member mounting bracket in accordance with an embodiment of the present disclosure.
Figure 5:
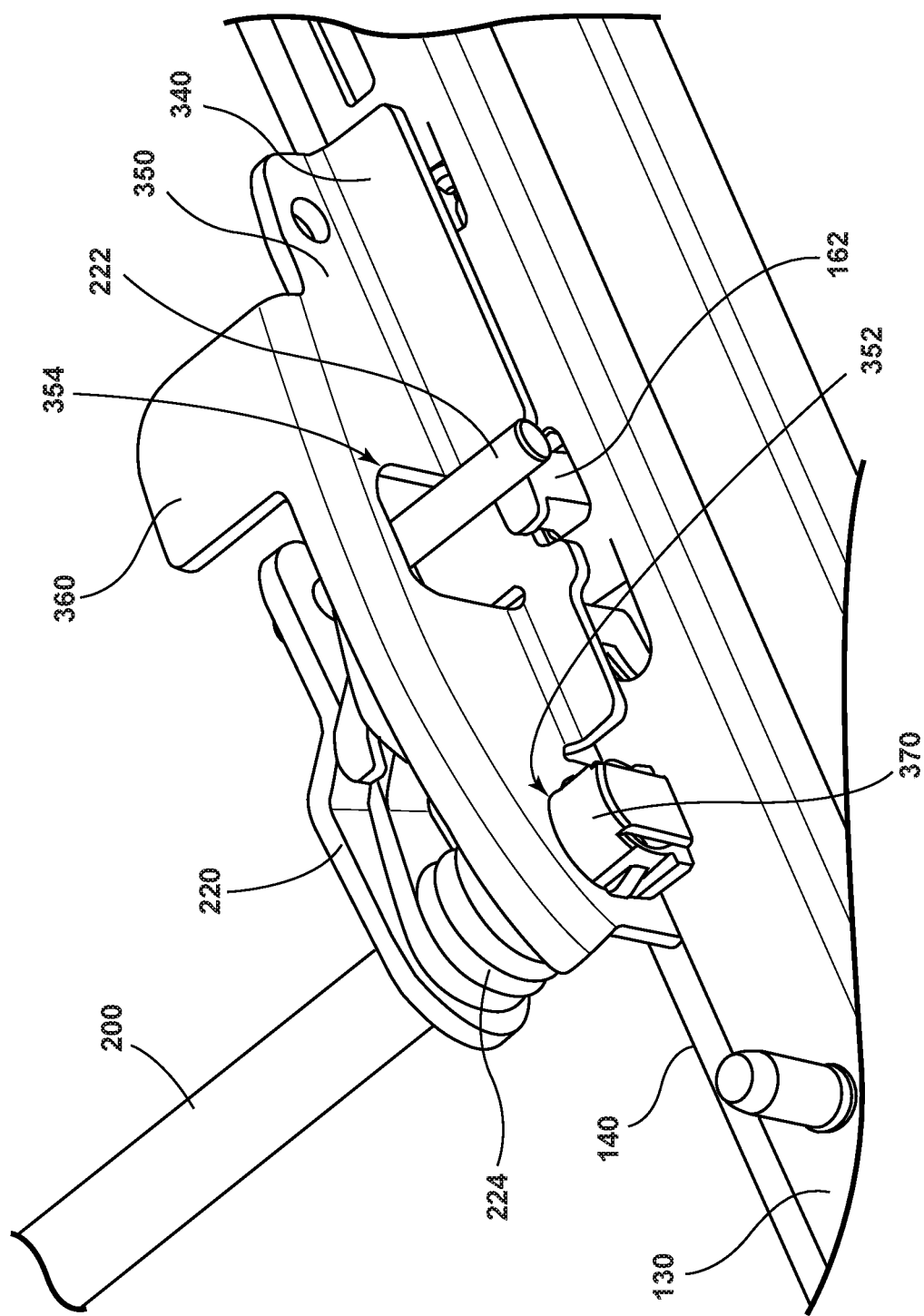
FIG. 5 is a perspective view generally illustrating portions of a second lockset and a cross member mounting bracket in accordance with an embodiment of the present disclosure.

In embodiments, such as generally illustrated in FIGS. 4 and 5, cross member 200 may be connected to first track 130 of second pair of track via a second mounting bracket 330. Mounting bracket 330 may include a first portion 340 that may be generally horizontal and may be connected to first track 130. Mounting bracket 330 may include second portion 350 that may be generally vertical portion and may extend from first portion 340. Vertical portion 350 may include a first aperture 352 that may be configured to receive cross member 200 and/or a bearing 370. Bearing 370 may be configured to facilitate rotation of cross member 200 and/or may be plastic. Second portion 350 may include a second aperture 354 though which second connecting member 222 may extend. A flange 360 may extend from second portion 350 and may be configured to limit rotation of second cross member lever 220. A resilient element 380 (e.g., a rubber stopper) may be disposed at least partially between second cross member lever 220 and flange 360. While some embodiments of a cross member 200 have been illustrated, other embodiments of cross member 200 could include one or more other configurations. For example, and without limitation, cross member 200 may include a remote configuration in which cross member 200 is actuated by remote handle connected to cross member 200 via one or more cables.

With embodiments, biasing members (e.g., biasing members 90, 170, 214, 224) may include one or more of a variety of shapes, sizes, configurations, and/or materials. For example, and without limitation, biasing members may include metal springs, coil springs, leaf springs, torsion springs, and/or other configurations, which may be configured to provide a biasing force to one or more components.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification, but that the scope of the present disclosure will include any embodiments falling within the foregoing description and the appended claims.

What is claimed is:

1. A track adjuster, comprising:
   a first pair of tracks;
   a first lockset configured to selectively restrict movement of the first pair of tracks;
   a second pair of tracks; and
   a second lockset configured to selectively restrict movement of the second pair of tracks;
   wherein the first lockset is a first type of lockset having a first set of pins moveable in a transverse direction to the first pair of tracks and the second lockset is a second type of lockset having a plurality of lock plates moveable about a longitudinal axis of the second pair of tracks
   wherein the second lockset is coupled with a first track of the second pair of tracks;
   wherein a first track of the first pair of tracks and the first track of the second pair of tracks include a first set of positions and a second set of positions relative to a second track of the first pair of tracks and a second track of the second pair of tracks, respectively;
   wherein engagement recesses of the second track of the second pair of tracks are configured such that in the first set of positions, the plurality of lock plates of the second lockset are aligned to engage the second track of the second pair of tracks, and, in the second set of positions, the plurality of lock plates of the second lockset are not aligned to engage the second track of the second pair of tracks; and
   wherein the first lockset is configured such that in the second set of positions, the first track of the first pair of tracks is permitted to shift to an adjacent position in the first set of positions to align the plurality of lock plates for engagement with the second track of the second pair of tracks.

2. The track adjuster of claim 1, wherein the first lockset includes a positive engagement locking lockset.

3. The track adjuster of claim 1, wherein the first set of pins includes a tapered configuration and a second set of pins of the first lockset includes a straight configuration.

4. The track adjuster of claim 3, wherein the second set of pins includes a first pin and a second pin; and the first set of pins includes a tapered pin disposed between the first pin and the second pin.

5. The track adjuster of claim 4, wherein the first set of pins includes a second tapered pin disposed between the first pin and the second pin.

6. The track adjuster of claim 1, wherein the first lockset includes a housing and a bracket connecting the housing with a movable track of the first pair of tracks.

7. The track adjuster of claim 6, wherein each pin of the first set of pins and a second set of pins of the first lockset are disposed at least partially in a recess of the bracket.

8. The track adjuster of claim 7, wherein each pin of the first set of pins and the second set of pins are disposed at least partially in an aperture of the housing.

9. The track adjuster of claim 1, including a cross member configured to actuate the first lockset and the second lockset, wherein the cross member includes a connecting member and is connected to a movable track of the second pair of tracks via a mounting bracket; and the mounting bracket includes a first connector, a second connector, a first aperture for receiving a bearing to facilitate rotation of the cross member, and a second aperture for receiving the connecting member to limit rotation of the cross member.

10. The track adjuster of claim 1, wherein each pin of the first set of pins and a second set of pins of the first lockset is configured to move independently of each other pin.

11. The track adjuster of claim 1, wherein the first lockset includes a plurality of biasing members, each biasing member configured to bias a respective pin of the first set of pins and a second set of pins of the first lockset.

12. The track adjuster of claim 1, wherein the second lockset includes a pawl-type lockset.

13. The track adjuster of claim 1, wherein the plurality of lock plates each have a plurality of teeth.

14. A track adjuster, comprising:
a first pair of tracks;
a first lockset configured to selectively restrict movement of the first pair of tracks;
a second pair of tracks;
a second lockset configured to selectively restrict movement of the second pair of tracks; and
a cross member configured to actuate the first lockset and the second lockset,
wherein the first lockset is a first type of lockset having a first set of pins moveable in a transverse direction to the first pair of tracks and the second lockset is a second type of lockset having a plurality of lock plates moveable about a longitudinal axis of the second pair of tracks;
wherein the cross member is connected to a movable track of the second pair of tracks via a mounting bracket; the mounting bracket includes a substantially horizontal portion connected to the movable track; the mounting bracket includes a substantially vertical portion extending from the substantially horizontal portion; the substantially vertical portion includes a first aperture for receiving a bearing and a second aperture through which a connecting member of the cross member extends; and the mounting bracket includes a flange configured to limit rotation of the cross member.

15. A track adjuster, comprising:
a first pair of tracks;
a first lockset configured to selectively restrict movement of the first pair of tracks;
a second pair of tracks including a bracket having a first aperture and a second aperture;
a second lockset configured to selectively restrict movement of the second pair of tracks; and
a cross member connected to the first and second apertures of the bracket,
wherein the first lockset is a first type of lockset and the second lockset is a second type of lockset.

16. The track adjuster of claim 15, wherein the second lockset is coupled with a first track of the second pair of tracks.

17. The track adjuster of claim 16, wherein a first track of the first pair of tracks and the first track of the second pair of tracks include a first set of positions and a second set of positions relative to a second track of the first pair of tracks and a second track of the second pair of tracks, respectively.

18. The track adjuster of claim 17, wherein engagement recesses of the second track of the second pair of tracks are configured such that in the first set of positions, a plurality of lock plates of the second lockset are aligned to engage the second track of the second pair of tracks, and, in the second set of positions, the plurality of lock plates of the second lockset are not aligned to engage the second track of the second pair of tracks.

19. The track adjuster of claim 18, wherein the first lockset is configured such that in the second set of positions, the first track of the first pair of tracks is permitted to shift to an adjacent position in the first set of positions.

* * * * *